United States Patent [19]
Miller

[11] Patent Number: 5,956,839
[45] Date of Patent: Sep. 28, 1999

[54] METHOD FOR TYING MAGNET WIRE LEADS

[75] Inventor: Joseph E. Miller, Fort Wayne, Ind.

[73] Assignee: General Electric Company, Schenectady, N.Y.

[21] Appl. No.: 09/061,692

[22] Filed: Apr. 16, 1998

[51] Int. Cl.⁶ ..................................................... H02K 15/00
[52] U.S. Cl. .................................. 29/596; 29/447; 310/71
[58] Field of Search ........................ 29/596, 447; 310/71; 174/36, 113 R

[56] References Cited

U.S. PATENT DOCUMENTS

| | | |
|---|---|---|
| 3,293,463 | 12/1966 | Church . |
| 3,502,917 | 3/1970 | Bizoe . |
| 4,227,103 | 10/1980 | Humes, Jr. et al. . |
| 4,382,653 | 5/1983 | Blanchard . |
| 4,647,716 | 3/1987 | Akiyama et al. . |
| 4,719,379 | 1/1988 | Daniels et al. . |
| 4,999,532 | 3/1991 | Bartell . |
| 5,098,752 | 3/1992 | Chang et al. . |
| 5,571,992 | 11/1996 | Maleski et al. . |

Primary Examiner—S. Thomas Hughes
Assistant Examiner—John C. Hong
Attorney, Agent, or Firm—Welsh & Katz, Ltd.; Wayne O. Traynham, Esq.; Carl B. Horton, Esq.

[57] ABSTRACT

A method for tying magnet wire leads is used with a motor that can be subjected to vibration and movement having solid, insulated start and main leads and a braided common lead. The method includes bundling the leads together to form a bundle of leads with the common lead having leads adjacent to only one side thereof. The bundled leads are bent in an arc of about 90° to orient the leads to form an outermost lead and an innermost lead relative to the bend. The bundled leads are oriented so that the common lead is at the innermost lead position. The oriented, bent leads are secured to an associated stationary lead support member using tie downs. The bundled leads are secured at a first location spaced from the bend and a second location spaced from the first location. The tie downs are positioned so as to contact the common lead and the lead support member. The common and start leads can be provided with a portion of shrink tubing extending at least coextensive with the bend.

4 Claims, 1 Drawing Sheet

METHOD FOR TYING MAGNET WIRE LEADS

FIELD OF THE INVENTION

This invention pertains to a method for tying down motor magnet wire leads. More particularly, the invention pertains to a method for tying down magnet wire leads from a motor that may be subjected to vibration and movement.

BACKGROUND OF THE INVENTION

Various types of motor lead mounts are known in the art. The motor leads are those wires that come from the motor and are routed to, for example, a power source or a control system. In a particular configuration in which a motor is connected to equipment, such as a pump, that may subject the motor to vibration or movement, the wire leads can easily be subjected to stresses that can break or yield the wire.

One accepted method to alleviate the problems of overstressing the wire leads is to use braided cable rather than solid conductors. Because the braided cable is composed of many strands of relatively thin gauge wire, it has been shown to better withstand the constant flexing that can result from vibration and movement. In a typical motor design, three leads are connected to the motor, namely, a first, common stranded lead, a second, solid conductor start wire and a third, also solid conductor main wire. Typically, the start and main wires are insulated wires that have 1–2 mils of enamel insulation. The enamel insulation is of a non-shrink type.

In one known method of mounting such leads that is used in vibration-free or substantially vitration-free environments, the leads exit the motor in a vertical direction, generally downwardly. The leads are then bent to run in a horizontal direction, which can be routed to, for example, a cable tray or conduit. The three leads, namely, the common, start and main leads, are bundled together and are pulled downward from the motor. When the leads are bent from the vertical to the horizontal direction, the common stranded lead is positioned on the outside of the bend. That is, the common lead is the outermost wire, and the wires are bundled so that the maximum amount of flexing that the bundled wires will be subjected to (at the outside of the bend) will be seen by the braided common lead. This, in turn, results in the start and main wires, which are positioned within the bend of the common lead, being subjected to less flexing. This arrangement, however, is used, as stated above, in vibration-free or substantially vibration-free environments.

In addition, in known mounting configurations, the bundled wires are typically tied or fastened to one another immediately downstream of a relatively short radius bend in the wires. That is, a wire tie is generally positioned immediately adjacent to or abutting the wire bend at the vertical portion of the wire run.

There are a number of difficulties that have been observed with current wire lead tie configurations. First, because the magnet wire leads can be part of the stator winding leads, stresses in these wire must be kept to a minimum. As a result, the magnet wire arrangement was not used in connection with motors subjected to movement and vibration because of the potential for the wire to yield or break. Second, the braided cables can be considerably more expensive than solid conductor wires. As such, use of multiple braided cables could increase the cost for motor mounting. Thus, cost considerations often played a large part in mounting configurations.

Accordingly, there continues to be a need for a magnet wire lead tie method which permits the use of solid conductor wires and which increases the reliability of the leads running from the motor to the associated source or control system. Such a method permits the use of stator winding solid conductor leads in a motor mounting configuration in which the motor can be subjected to vibration and movement.

SUMMARY OF THE INVENTION

A method for tying magnet wire leads from a motor having a common lead, a start lead and a main lead includes bundling the leads together to form a bundle of leads, the bundle being formed so that the common lead has leads adjacent to only one side thereof. The motor leads include insulated, solid main and start leads and a braided common conductor. The bundled leads are bent in an arc of about 90° to reorient the leads. The bend is formed to define an outermost lead and an innermost lead with the braided common conductor being positioned as the innermost lead. The bundled leads are secured to an associated stationary lead support member using tie-downs. The bundled leads are secured at a first location and a second location, the first location being spaced from the arc and the second location being spaced from the first location. The tie downs are positioned so as to contact the common lead and the lead support member.

DETAILED DESCRIPTION OF THE INVENTION

Figure 1:
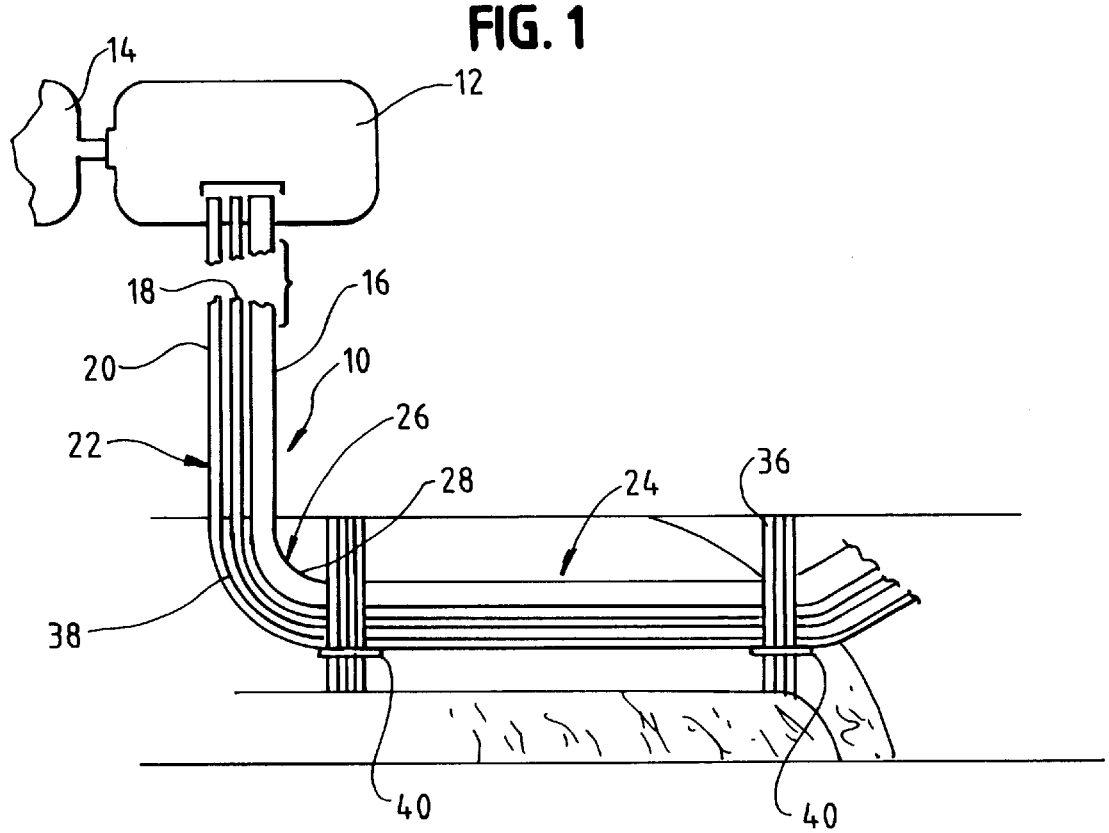
FIG. 1 is an illustration of a bundled set of motor leads that are tie-down in accordance with the principles of the present invention.

Referring now to FIG. 1, there is shown a set of motor leads generally illustrated at 10 running from a motor 12, which leads 10 are tied down in accordance with the principles of the present invention. In the exemplary arrangement, the motor 12 is operably connected to a component 14, such as a pump or compressor, that is subjected to or produces vibration and/or movement when in operation. Thus, the exemplary embodiment illustrates one configuration in which magnet wire leads 10 are used in an environment that may not be vibration free. Such configurations can include, for example, motors 12 for piston pumps, diaphragm pumps, scroll-case compressors and the like. Those skilled in the art will recognize those situations and designs in which such a mounting configuration can be used. Another contemplated use of the present tie-down arrangement is for pumps and equipment that frequently cycle, that is, pumps and equipment that frequently start and stop.

In previously known motor mounting arrangements, magnet wire lead configurations were not used unless the arrangement provided for a vibration-free or substantially vibration-free environment. This was due, in part, to the high stresses to which the wire leads could be subjected. These stresses resulted from flexing due to starting and stopping the equipment as well as vibration resulting from operation. Such magnet wire lead arrangements were not used because the magnet wires are part of the stator winding. As such, if the wires were to yield or break, it could result in fairly significant maintenance required or possible replacement of the motor.

In an exemplary arrangement of the present invention in an arrangement in which a motor 12 and the leads exiting therefrom can be subjected to vibration and movement, the motor 12 includes three leads, namely a common lead 16, a start lead 18 and a main lead 20. The common or ground lead 16 is typically formed from braided cable. As discussed above, braided cable is formed from multiple, individual strands that are subsequently braided with one another to form the conductor. It has been found that such a braided cable can more readily withstand flexing and bending. The start and main leads, 18, 20, however, are solid conductors rather than braided cable. Generally, these wires are part of the motor stator winding, and thus, they cannot be formed from braided cable.

As shown in FIG. 1, the common 16, start 18 and main 20 leads exit from the motor 12, in a generally vertically downward orientation. The leads 16–20 can be bundled together to more efficiently install the motor-pump assembly 12, 14. In order to properly route the leads 16–20, generally, the leads 16–20 are bent from a vertical orientation as indicated at 22 to a horizontal orientation as indicated at 24. It has been found that when the leads 16–20 are bundled and bent as indicated at 26, about 90°, with the common lead 16 on an innermost portion 28 of the bend 26, unexpectedly the service life of the start and main leads 18–20 can increase rather than decrease.

Figure 2:
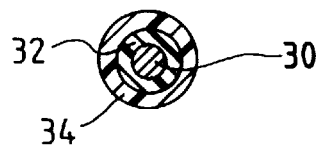
FIG. 2 is a cross-section of an exemplary solid lead conductor having a portion of shrink tubing positioned thereon.

Unlike the leads of known mounting configurations, the solid conductor start and main wires which include solid conductors 30 and an enameled insulation 32 are configured with a section of shrink tubing 34 positioned thereover, as shown in FIG. 2. It has been found that the addition of about 3–5 mils of shrink tubing 34 over the typical 1–2 mils of enamel insulation 32 enhances the overall strength of the conductor 18, 20. It is believed that the addition of shrink tubing 34 distributes the bending stresses over the area of shrink tubing 34 as well as the enamel insulation 32. Also, the addition of shrink tubing 34 increases the overall diameter of the leads 18, 20. As such, it has been found that uninsulated leads can fail after approximately 500,000 simulated starts (which correspond to individual back and forth flexes), whereas, advantageously, wire leads having shrink tubing 34 added over the insulation 32 exhibit increases in the number of simulated starts prior to yielding or failure of the conductor to about 2.5 million. Thus, a five-fold increase in the service life of the leads 18, 20 has been shown.

In a current configuration, the leads 16–20 exit from the motor 12 generally vertically downwardly and are bent about 90°. In known mounting configurations, the leads 16–20 are tied to one another immediately adjacent to the 90° bend in the vertical run of the leads and the common braided cable is positioned at the outermost portion of the bend.

In the present method, the common braided cable 16 is positioned at an innermost position, indicated at 28, relative to the cable bundle 10, and the ties 36 are shifted away from the bend. In this configuration, the common lead 16 has the start and main leads, 18, 20 positioned on only one side of the common lead 16, and the start and main leads 18, 20 are positioned on an outermost portion 38 of the bend 26. The leads 18, 20 are secured or tied-down to a lead support member 40 by ties 36.

Additionally, the bend 26 is formed with a relatively large radius. The combination of the large radius bend 26 and shifting of the tie-down 36 point away from the bend 26 relieves the stresses on the leads 16–20. In addition, the position of the tie 36 over the common lead 16 rather than over the main and start leads 16, 18 permits slight movement of the solid conductors 18, 20 into the tie 36 point. This, in addition to the large radius bend 26 and shifted tie 36 point also reduces or relieves the strain which results in increased wire service life.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

I claim:

1. A method for tying magnet wire leads from a motor that can be subjected to vibration and movement having a common lead, a start lead and a main lead, the start and main leads formed from insulated, solid conductors, the common lead formed from a braided conductor having first and second sides, comprising the steps of:

bundling the leads together to form a bundle of leads, the bundle being formed so that the braided common lead has leads adjacent to only one side thereof;

bending the bundled leads in an arc of about 90° to reorient the leads, the bend being configured to form an outermost lead at an outer position of the bent bundle of leads and an innermost lead at an inner position of the bent bundle of leads;

orienting the bent bundle of leads to position the common lead at the innermost lead position;

securing the bundled leads to an associated stationary lead support member using tie-downs, the bundled leads being secured at a first location and a second location, the first location being spaced from the arc and the second location being spaced from the first location, the tie-downs being positioned so as to contact the common lead and the lead support member.

2. The method for tying down magnet wire leads in accordance with claim 1 including the step of positioning a portion of a shrink tubing on the start and main leads at about the bend in the leads.

3. The method for tying down magnet wire leads in accordance with claim 2 including the step of positioning the portion of shrink tubing on the start and main leads wherein the shrink tubing extends on each of the leads at least coextensive with the bend in the leads.

4. The method for tying down magnet wire leads in accordance with claim 1 including the step of bending the leads in an arc of about 90° to reorient the leads from a vertical orientation to a horizontal orientation.

* * * * *